Figures 1, 2:
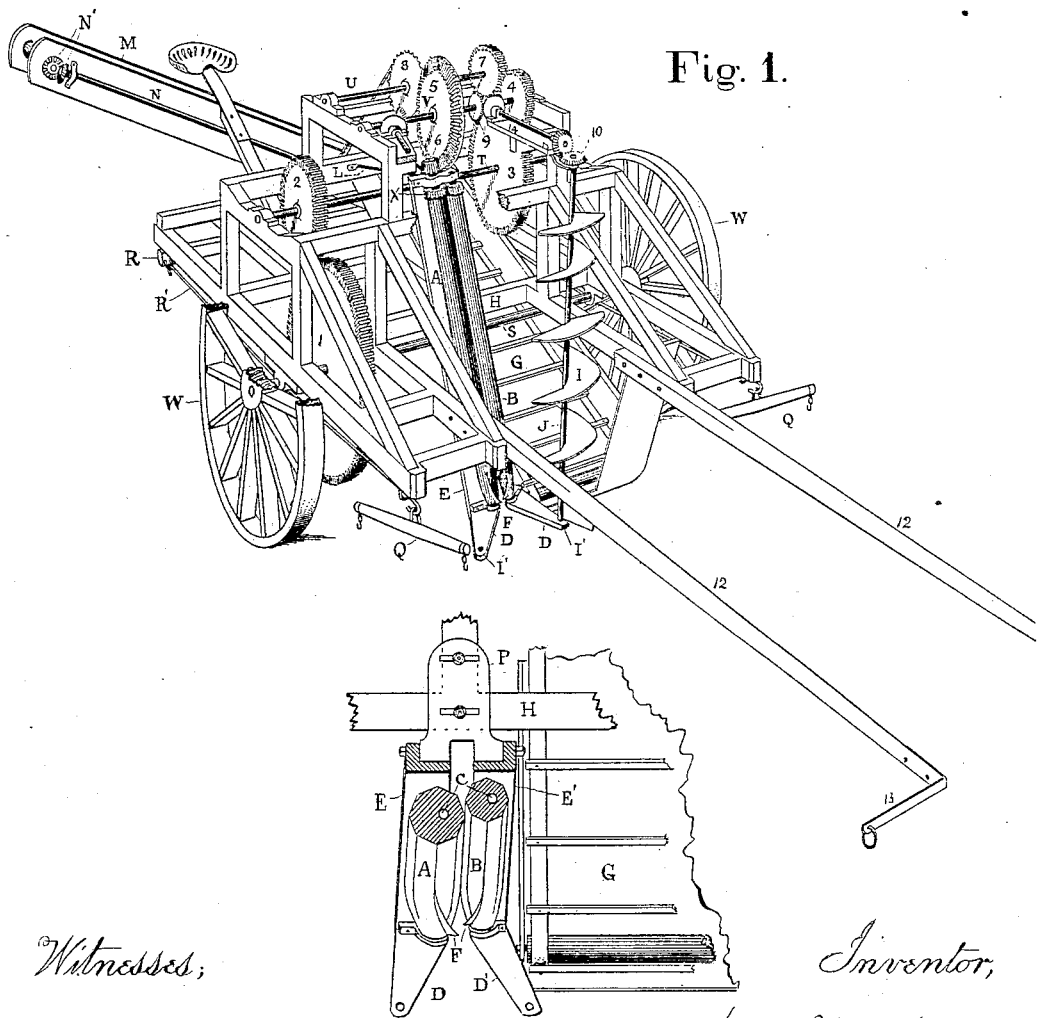

(No Model.)

J. W. TERMAN.
CORN HARVESTER AND HUSKER.

No. 291,643. Patented Jan. 8, 1884.

Witnesses;
H W Wells
Rich⁴ A. Goldsbrough

Inventor,
James W. Terman,
per A. B. Upham.
Attorney in fact.

United States Patent Office.

JAMES W. TERMAN, OF PEORIA, ILLINOIS, ASSIGNOR TO JOSIAH CRATTY, OF SAME PLACE.

CORN HARVESTER AND HUSKER.

SPECIFICATION forming part of Letters Patent No. 291,642, dated January 8, 1884.

Application filed December 1, 1882. (No model.)

*To all whom it may concern:*

Be it known that I, JAMES W. TERMAN, of Peoria, in the county of Peoria, in the State of Illinois, have invented an Improved Corn Harvester and Husker; and I do hereby declare that the following is a full, clear, and exact description thereof, reference being had to the annexed drawings, making a part of this specification, in which like letters of reference refer to like parts, and in which—

Figure 1 represents a perspective view; Fig. 2, a detail view of rollers.

My invention is in that line of corn harvesters and huskers in which a pair of rollers catch the uncut stalks of corn as the machine advances to them, and press the ears of corn out from their containing-husks into an elevator provided to convey them to some suitable receptacle.

This invention relates more particularly to improvements in the construction and arrangement of the rollers, and to a mode of raising the downfallen stalks of corn, to prevent thereby the catching in the rollers of the upper ends of the stalks before their lower ends.

In Fig. 1 the general arrangement of the frame-work of the machine is plainly enough shown without reference thereto with letter and detailed description.

12 12 represent the double tongue; Q Q, the whiffletrees; R, the double-tree. W W are the supporting and driving wheels of the machine; S, the shaft to which they are secured. The spur-wheel 1, keyed to the said shaft S, meshes with the smaller spur-wheel 2 on the shaft T. From this shaft T accelerated motion is transmitted through the spur-wheels 3 and 4 to the shaft V. The bevel-gear 5, keyed to said shaft V, conveys, through the small bevel-gear 6 at the upper end of the roller A, a rapid motion of rotation to both the rollers A and B, two equal spur-gears, X, causing B to partake of the motion of A. Said rollers A and B, instead of having bearings directly secured to the frame-work of the machine, are mounted upon two parallel beams, E E', one beam to each roller. The object of this is, of course, to give room for the cornstalks to escape readily from the rollers, so that the foot of each roller has its own separate bearing in its own supporting-beam, E or E'. At the upper ends of these beams E E' the bearings of the rollers A and B are made in the same piece of metal, bolted to each beam E E', for the purpose of binding said upper ends of the beams E E' firmly together. These united ends of said beams are held in longitudinal and lateral position by means of one or more brace-rods, L. The centers of said beams E E' are secured parallel a few inches apart by being bolted to the plate P, as shown in Fig. 2. This plate P is in its turn fastened to a cross-beam of the machine, and holds thereby the said beams E E', and through them the rollers A and B, in the desired position, as shown in Fig. 1. To enable me to adjust laterally the lower ends of my two rollers with respect to the elevator G, and thereby change their angle of inclination, I make said plate P adjustable upon its supporting cross-beam by having the bolt-hole elongated, through which passes the bolt that confines said plate P upon its said cross-beam. The object of this lateral adjustability is to adapt the machine for the different widths of rows in which corn is planted. Since the driver sits nearer one side of his machine, he can so drive as to keep the nigh wheel always directly between two rows of corn, whatever the distance between the rows, and the lower ends of these beams E E' be thus adjusted to be exactly in line with the row of corn to be gathered.

Firmly secured to the foot of the beams E E' are two forwardly-projecting horizontal ingatherers, D D'—one to each beam. At the outer extremity of each of these ingatherers is a bearing for the vertical rods J, about which wind the spiral webs I. In Fig. 1 only one of these two spiral lifters I is shown, the other being removed that it might not obscure the view of the rollers A and B. Said lifters I are rotated by means of bevel-gears 10, which receive motion, through the shaft 14 and the bevel-gears 9, from the shaft V. These lifters I rotate in opposite directions, and each in the same direction as its corresponding roller. The object of these lifters is to lift up the stalks of corn that may be almost prostrate upon the ground.

As shown in the drawings, the upper ends of the rollers A and B are inclined backward and also somewhat sidewise over the elevator G. The axes of rotation C of the rollers A and B I make at one side of their constructive axes, as shown in the drawings, Fig. 2, that they may revolve eccentrically. By this eccentric construction of the rollers the cornstalks, while being drawn through them, are violently shaken from side to side to aid, as an ear of corn reaches said rollers, in the breaking of the butt by which said ear of corn is held in its containing-husk. This shaking also reenforces the pressure of the rollers to aid in expelling the ears of corn from their husks after the butt is broken. The lower ends of my rollers A and B, I make somewhat tapering in form, and construct thereat two or more spiral flanges, F, the object of which is to prevent choking or clogging of the rollers by any extra large stalks being unable to start in.

The elevator G discharges its contents over into the elevator M, by the latter of which the corn is carried up to one side of the harvester and dropped into a wagon traveling alongside thereat. Said elevators G and M are constructed similarly to those ordinarily used in agricultural machinery, and consist of horizontal strips fastened at their ends to endless belts traversing about rollers, one at each end of the inclined plane forming the floors of the elevators. The upper roller, by which the elevator G is moved, is rotated by a sprocket-wheel fixed to its axis, and receiving power from a chain about it and the sprocket-wheel 8. Said wheel 8 takes its power through its shaft U and the spur-wheels 7 and 4. The upper roller of the elevator M is rotated by means of the bevel-gears N' and the shaft N, which is coupled with the axis of the said upper roller of the elevator G.

Two horses are used in drawing this harvester, one at the outside of each of the two tongues 12 12, and attached to the whiffletrees Q Q. Said whiffletrees Q Q are secured to the double-tree R at the rear of the machine by the rods R' R'. As this corn-harvester progresses through the field, the hills of corn come in between the two tongues 12 12, and the stalks, being crowded into the vertex of the ingatherers D D', are forced in between the rollers A and B by the flanges F. Whatever stalks are lopping over are straightened up by the lifters I I. Now, as the stalks are forced along through the rollers A and B, each ear thereon is met by the revolving hexagonal faces of the same and pressed out from its enveloping-husks, and as they are shot out fall into the elevator G. From here the corn is carried up to the elevator M, and from thence to the wagon, as before mentioned. The stripped stalks are all left standing in the field.

What I claim as my invention, and for which I desire Letters Patent, is as follows, to wit:

1. In corn harvester and husking machines, the eccentric rollers A and B, substantially as and for the purpose set forth.

2. In a corn-husker, the polygonal, eccentric, and unequal rollers A and B, substantially as and for the purpose specified.

3. In a corn harvester and husker, two unequal rollers having the smaller set back farther than the other, as and for the purpose described.

4. In a corn harvester and husker, two polygonal, eccentric, and unequal rollers, A and B, having the smaller of the two set back partially in the rear of the larger, substantially as and for the purpose specified.

5. Two rollers, A and B, and means to rotate them, in combination with the parallel supporting-beams E E', having bearings thereon for said rollers, the adjusting-plate P, and suitable frame-work, substantially as and for the purpose set forth.

6. The rollers A and B, inclined laterally and rearwardly, in combination with the parallel beams E E', having bearings thereon for said rollers, the adjusting-plate P, rotating mechanism for said rollers, and suitable frame-work, substantially as described.

7. The rollers A and B, means to rotate them, supporting-beams E E', and ingatherers D D', in combination with the rods J J, having spiral webs I I, and rotating mechanism for the same, as set forth.

8. The rollers A and B, having tapering ends and spiral flanges F, the beams E E', and ingatherers D D', in combination with the rods J J, having lifters I I, substantially as set forth.

9. The shaft V, taking power from the drive-wheel shaft S, bevel-gears 5 and 6, and the parallel beams E E', having brace-rods L, in combination with the two inclined, eccentric, and unequal rollers A and B.

10. The shaft V, taking power from the drive-wheel shaft S, the bevel-gears 5 and 6, the rollers A and B, and beams E E', in combination with the adjusting-plate P, ingatherers D D', the lifters I I, bevel-gears 10, the shaft 14, and gears 9, as described.

In testimony that I claim the foregoing invention I have hereunto set my hand this 27th day of November, 1882.

JAMES W. TERMAN.

Witnesses:
  JAMES P. ROBERTS,
  MARY E. CULVER.